(12) United States Patent
Guo et al.

(10) Patent No.: US 12,489,891 B2
(45) Date of Patent: Dec. 2, 2025

(54) REDUCING GRID ARTIFACTS IN VIDEO FRAMES

(71) Applicant: Zoom Video Communications, Inc., San Jose, CA (US)

(72) Inventors: Yi Guo, Zhejiang (CN); Zhichu He, Zhejiang (CN); Rui Li, Zhejiang (CN); Bo Ling, Saratoga, CA (US); Jing Wu, Zhejiang (CN); Minxia Yang, Zhejiang (CN); YiChen Zhang, Zhejiang (CN)

(73) Assignee: Zoom Communications, Inc., San Jose, CA (US)

( * ) Notice: Subject to any disclaimer, the term of this patent is extended or adjusted under 35 U.S.C. 154(b) by 187 days.

(21) Appl. No.: 18/210,726

(22) Filed: Jun. 16, 2023

(65) Prior Publication Data
US 2024/0422314 A1    Dec. 19, 2024

(51) Int. Cl.
*H04N 19/119* (2014.01)
*H04N 19/176* (2014.01)
*H04N 21/4402* (2011.01)
*H04N 21/4788* (2011.01)

(52) U.S. Cl.
CPC ......... *H04N 19/119* (2014.11); *H04N 19/176* (2014.11); *H04N 21/4402* (2013.01); *H04N 21/4788* (2013.01)

(58) Field of Classification Search
None
See application file for complete search history.

(56) References Cited

U.S. PATENT DOCUMENTS

| | | | |
|---|---|---|---|
| 2016/0156907 A1* | 6/2016 | Liang | H04N 19/147 375/240.12 |
| 2018/0070106 A1* | 3/2018 | Han | H04N 19/134 |
| 2021/0211737 A1* | 7/2021 | Helmrich | H04N 19/172 |
| 2022/0078442 A1* | 3/2022 | Chen | H04N 19/172 |

* cited by examiner

*Primary Examiner* — Kaitlin A Retallick
(74) *Attorney, Agent, or Firm* — Kilpatrick Townsend & Stockton, LLP

(57) ABSTRACT

In one example, a video encoder divides a superblock of a video frame into subblocks. The dividing includes dividing the superblock according to a first and second partitioning schemes to generate a first and second combination of subblocks, respectively. The number of non-zero residuals in each subblock in the first and second combinations of subblocks is less than a corresponding threshold set for a size of the subblock. The encoder determines the subblocks for the superblock as the first combination of subblocks based on a first cost value associated with the first combination of subblocks being lower than a second cost value associated with the second combination of subblocks. The encoder further encodes the superblock into a video bitstream representing the video by encoding the subblocks.

20 Claims, 9 Drawing Sheets

REDUCING GRID ARTIFACTS IN VIDEO FRAMES

TECHNICAL FIELD

The present application generally relates to video encoding and, more particularly, relates to techniques for reducing grid artifacts in coded video frames.

BRIEF DESCRIPTION OF THE DRAWINGS

The accompanying drawings, which are incorporated into and constitute a part of this specification, illustrate one or more certain examples and, together with the description of the examples, serve to explain the principles and implementations of the certain examples.

DETAILED DESCRIPTION

Figure 1:
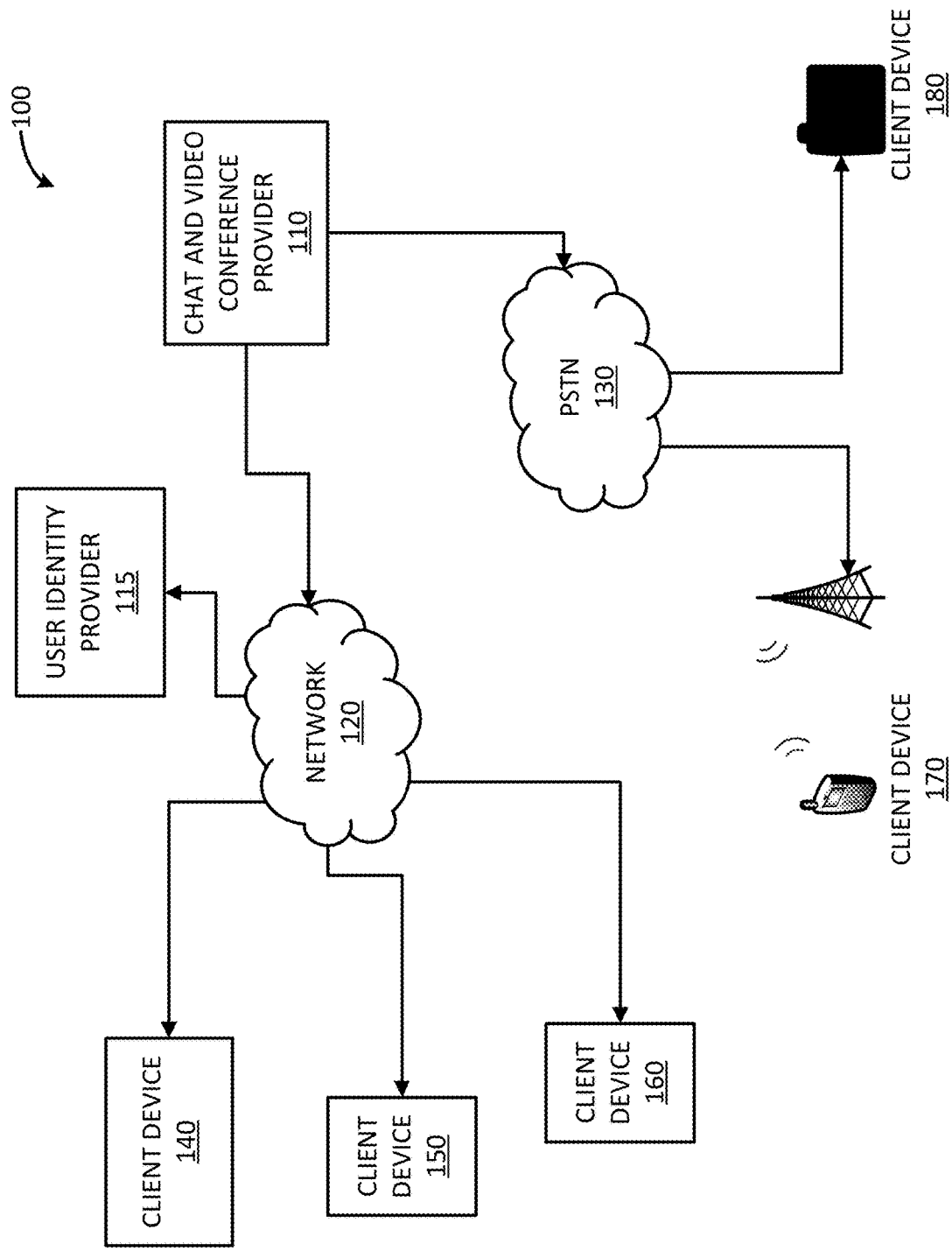
FIG. 1 shows an example of a system for providing videoconferencing and chat functionality to various client devices according to some aspects of the present disclosure.

Examples are described herein in the context of reducing grid artifacts in coded video frames. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Videoconferencing has become a common way for people to meet as a group, without having to be at the same physical location. Participants can be invited to a videoconference meeting, join from their personal computers or telephones, and are able to see and hear each other and converse largely as they would during an in-person group meeting or event. In particular, the participants receive audio and video streams from the other participants and are presented with views of the video streams and audio from the audio streams. Using these different modalities, the participants can see and hear each other, engage more deeply, and generally have a richer experience despite not being physically in the same space.

During a videoconference, the video streams may undergo some level of compression for various reasons, such as to reduce network bandwidth usage, latency, or lag. This compression is normally performed by a video encoder on the client device that is providing the video stream. After compressing the video stream, the client device transmits the compressed video stream to the other client devices associated with the other participants in the videoconference. Those client devices can then decompress the compressed video stream using their respective video decoders.

Although there are many different kinds of compression techniques, a typical compression process will normally involve an initial blocking operation in which a video frame is divided into rectangular blocks of pixels, which are referred to herein as coding blocks. A coding block can have 128×128 pixels, 64×64 pixels, 32×32 pixels, 8×8 pixels, 4×4 pixels, or other sizes. Each coding block may be predicted using blocks that have been previously encoded, via intra- or inter-prediction. The difference between the predicted values and the original values of a coding block, also referred to as residuals, can be calculated. A transform operation can be performed in which a transform function (e.g., a discrete cosine transform or a discrete wavelet transform) is applied to the residuals in each block, to transform the residuals into frequency-domain coefficients. For example, if a coding block has 8×8 pixels, the transform function would operate on 64 input residual values and yield 64 frequency-domain coefficients. These frequency-domain coefficients can be referred to as frequency residuals, since they represent residuals in the frequency domain, as described in greater detail later on. After the transform operation, a quantization operation can be performed to quantize the frequency residuals. During the quantization operation, each frequency residual is compared to a predefined quantization threshold. Frequency residuals that fall below the quantization threshold are set to zero. Thus, following quantization, more of the frequency residuals may have values of zero than prior to quantization. After the quantization operation, an entropy coding may be performed to reduce the number of bits used to represent the quantized frequency residuals. Examples of the entropy coding can include run-length encoding, variable-length encoding, and arithmetic coding. Other operations may also be performed at various points during the compression process, such as in-loop filtering.

When a compression process is applied to a video stream, it can produce various kinds of artifacts that can reduce the quality of the video stream. There are two main types of compression artifacts-spatial artifacts and temporal artifacts. Spatial artifacts are location based. Examples of spatial artifacts can include basis patterns, pixelating, color bleeding, and grid artifacts. Grid artifacts can be similar to blurring, in which there is a loss of high spatial frequency image detail, typically at sharp edges, that makes discrete objects (e.g., as opposed to the entire video frame) appear out of focus. Temporal artifacts are time/sequence based. Examples of temporal artifacts can include flickering, jerkiness, and floating such as edge floating or texture floating. Both types of compression artifacts can be disruptive, annoying, and subjectively displeasing to viewers of the video stream.

Because compression artifacts can degrade the perceived quality of a video, it can be desirable to reduce or eliminate them as much as possible. To that end, some examples of the present disclosure can help alleviate grid artifacts in a video, such as a video stream or a recorded video. For example, a system can first divide a video frame (e.g., an image) into superblocks. The system can then evaluate each superblock to determine the partitioning scheme to divide the superblock into multiple subblocks which are used as coding blocks for encoding. For instance, the system partitions the superblock in different ways using different partitioning schemes. As a result, multiple partitioning schemes can be determined for the same superblock. The system can select a partitioning scheme among the multiple partitioning schemes based on certain factors, such as a cost value, to alleviate (e.g., reduce or prevent) grid artifacts in the video frame. The system further encodes (e.g., compress using a video encoder) the superblock using the combination of subblocks generated by the selected partitioning scheme as coding blocks.

This illustrative example is given to introduce the reader to the general subject matter discussed herein and the disclosure is not limited to this example. The following sections describe various additional non-limiting examples.

FIG. 1 shows an example of a system 100 for providing videoconferencing and chat functionality to various client devices according to some aspects of the present disclosure. The system 100 includes a chat and videoconference provider 110 that is connected to multiple communication networks 120 and public switched telephone network (PSTN) 130, through which various client devices 140-180 can participate in videoconferences hosted by the chat and videoconference provider 110. For example, the chat and videoconference provider 110 can be located within a private network to provide video conferencing services to devices within the private network, or it can be connected to a public network, e.g., the internet, so it may be accessed by anyone. Some examples may even provide a hybrid model in which a chat and videoconference provider 110 may supply components to enable a private organization to host private internal videoconferences or to connect its system to the chat and videoconference provider 110 over a public network.

It should be understood that in some examples, the chat and videoconference provider 110 may be a chat provider providing only a chat functionality, while in other example examples, the chat and videoconference provider 110 may be a videoconference provider providing only video conferencing functionality. Furthermore, although the chat and videoconference provider 110 are shown as one entity, other configurations are considered. For example, a chat provider may have a structure similar to that of chat and videoconference provider 110, and a videoconference provider may also have a structure similar to the chat and videoconference provider 110. The chat provider and the videoconference provider may be connected through the same network (e.g., the network 120), or may be operable to communicate with each other through another shared network.

The system optionally also includes one or more user identity providers, e.g., user identity provider 115, which can provide user identity services to users of the client devices 140-160 and may authenticate user identities of one or more users to the chat and videoconference provider 110. In this example, the user identity provider 115 is operated by a different entity than the chat and videoconference provider 110, though in some examples, they may be the same entity.

In some examples, the chat and videoconference provider 110 may provide a chat functionality. In such examples, the chat and videoconference provider 110 may allow a user to create one or more chat channels where the user may exchange messages with other users that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and videoconference provider 110 may provide permission to a user and/or an owner of the chat channel may provide permission to the user. Furthermore, there may be any number of users permitted in the chat channel.

Figure 2:
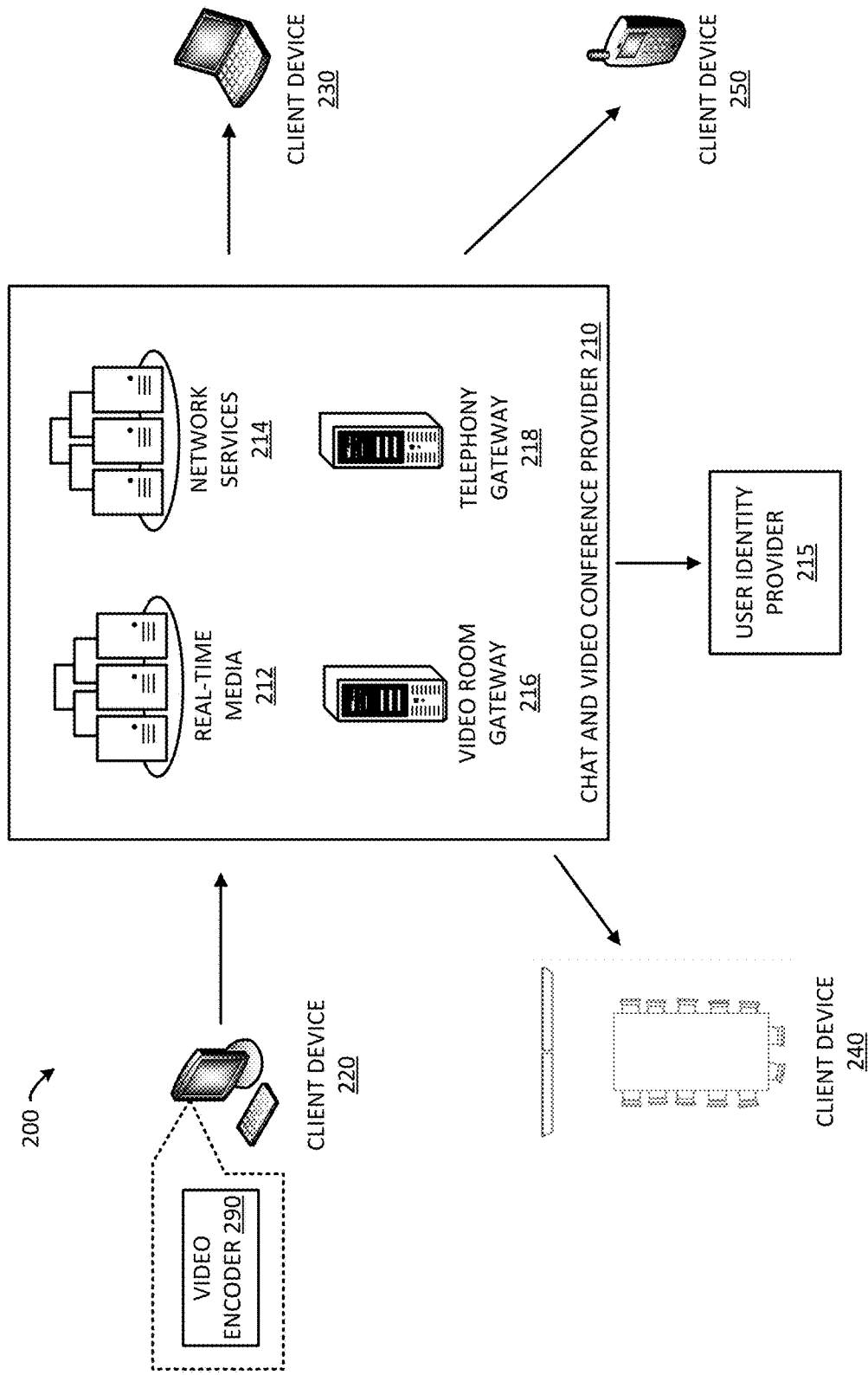
FIG. 2 shows another example of a system for providing videoconferencing and chat functionality to various client device according to some aspects of the present disclosure.

The chat and videoconference provider 110 may also provide video conferencing functionality. For example, the chat and videoconference provider 110 may allow clients to create videoconference meetings (or "meetings") and invite others to participate in those meetings as well as perform other related functionality, such as recording the meetings, generating transcripts from meeting audio, manage user functionality in the meetings, enable text messaging during the meetings, etc. FIG. 2, described below, provides a more detailed description of the architecture and functionality of the chat and videoconference provider 110.

Meetings in this example chat and videoconference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

Chat channels may be provided by the chat and videoconference provider 110 to which participants are connected. Similar to the meetings discussed above, the chat channels are constructs provided by a server where the messages are received then directed to the various participants. The messages may include text, audio files, video files, image files, or any other electronic file type.

To create a meeting with the chat and videoconference provider 110, a user may contact the chat and videoconference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the chat and videoconference provider 110 may prompt the user for certain information, such as a date, time, and duration for the meeting, a number of participants, a type of encryption to use, whether the meeting is confidential or open to the public, etc. After receiving the various meeting settings, the chat and videoconference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The chat and videoconference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the chat and videoconference provider 110. The client devices also receive audio or video information from the chat and videoconference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The chat and videoconference provider 110 may also invalidate the meeting information, such as the meeting identifier or password/passcode.

The chat and videoconference provider 110 may use a similar process as is used to create a meeting to create a chat channel. A user may contact the chat and videoconference provider 110 using a client device 140-180 and select an option to create a chat channel. Such an option may be provided in a webpage accessed by a client device 140-160 or client application executed by a client device 140-160. To create the chat channel, the chat and videoconference provider 110 may prompt the user for certain information, a number of participants, a type of encryption to use, whether the chat channel is confidential or open to anyone, a title or subject, etc. After receiving the various chat channel settings, the chat and videoconference provider may create a record for the chat channel and generate a chat identifier to one or more user invited to the chat channel. In some examples, the certain information associated with the chat channel may be automatically generated by the chat and videoconference provider 110.

To provide such functionality, one or more client devices 140-180 may communicate with the chat and videoconference provider 110 using one or more communication networks, such as network 120 or the PSTN 130. The client devices 140-180 may be any suitable computing or communications device that have audio or video capability. For example, client devices 140-160 may be conventional computing devices, such as desktop or laptop computers having processors and computer-readable media, connected to the chat and videoconference provider 110 using the internet or other suitable computer network. Suitable networks include the internet, any LAN, MAN, WAN, cellular network (e.g., 3G, 4G, 4G LTE, 5G, etc.), or any combination of these. Other types of computing devices may be used instead or as well, such as tablets and/or smartphones.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and videoconference provider 110. It should be appreciated that certain computing devices may also provide telephony functionality and may operate as telephony devices. For example, smartphones typically provide cellular telephone capabilities and thus may operate as telephony devices in the system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these client devices 140-160 contact the chat and videoconference provider 110 using network 120 and may provide information to the chat and videoconference provider 110 to access functionality provided by the chat and videoconference provider 110, such as access to create new meetings/chat channels or join existing meetings/chat channels. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and videoconference provider 110.

A user identity provider 115 may be any entity trusted by the chat and videoconference provider 110 that can help identify a user to the chat and videoconference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as two-factor authentication. However, identities may be distinct from functionality such as email. For example, a healthcare provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and videoconference provider 110.

When the user accesses the chat and videoconference provider 110 using a client device, the chat and videoconference provider 110 communicates with the user identity provider 115 using information provided by the user to verify the user's identity. For example, the user may provide a username or cryptographic signature associated with a user identity provider 115. The user identity provider 115 then either confirms the user's identity or denies the request.

Based on this response, the chat and videoconference provider 110 either provides or denies access to its services, respectively.

For telephony devices, e.g., client devices 170-180, the user may place a telephone call to the chat and videoconference provider 110 to access videoconference services. After the call is answered, the user may provide information regarding a videoconference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and videoconference provider 110. For example, telephony devices may be unable to provide user identification information to identify the telephony device or the user to the chat and videoconference provider 110. Thus, the chat and videoconference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak or share content in a meeting or chat, hear or view certain content shared in the meeting, or access other meeting functionality.

It should be appreciated that users may choose to participate in meetings anonymously and decline to provide user identification information to the chat and videoconference provider 110, even in cases where the user has an authenticated identity and employs a client device capable of identifying the user to the chat and videoconference provider 110. The chat and videoconference provider 110 may determine whether to allow such anonymous users to use services provided by the chat and videoconference provider 110. Anonymous users, regardless of the reason for anonymity, may be restricted as discussed above with respect to users employing telephony devices, and in some cases may be prevented from accessing certain meetings or other services, or may be entirely prevented from accessing the chat and videoconference provider 110.

Referring again to chat and videoconference provider 110, in some examples, it may allow client devices 140-160 to encrypt their respective chat and/or video and audio streams to help improve privacy in their meetings. Encryption may be provided between the client devices 140-160 and the chat and videoconference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and videoconference provider 110, while allowing the chat and videoconference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and videoconference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and videoconference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Now referring to FIG. 2, shown is an example of a system 200 in which a chat and videoconference provider 210 provides videoconferencing functionality to various client devices 220-250 according to some aspects of the present disclosure. The client devices 220-250 include two conventional computing devices 220-230, dedicated equipment for a videoconference room 240, and a telephony device 250. Each client device 220-250 communicates with the chat and videoconference provider 210 over a communications network, such as the internet for client devices 220-240 or the PSTN for client device 250, generally as described above with respect to FIG. 1. The chat and videoconference provider 210 is also in communication with one or more user identity providers 215, which can authenticate various users to the chat and videoconference provider 210 generally as described above with respect to FIG. 1.

In this example, the chat and videoconference provider 210 employs multiple different servers (or groups of servers) to provide different chat and/or videoconference functionality, thereby enabling the various client devices to create and participate in chat channels and/or videoconference meetings. The chat and videoconference provider 210 uses one or more real-time media servers 212, one or more network services servers 214, one or more video room gateway servers 216, and one or more telephony gateway servers 218. Each of these servers 212-218 is connected to one or more communications networks to enable them to collectively provide access to and participation in one or more chat channels and/or videoconference meetings to the client devices 220-250.

The real-time media servers 212 provide multiplexed multimedia streams to meeting participants, such as the client devices 220-250 shown in FIG. 2. While chat and/or video and audio streams typically originate at the respective client devices, they are transmitted from the client devices 220-250 to the chat and videoconference provider 210 via one or more networks where they are received by the real-time media servers 212. The real-time media servers 212 determine which protocol is optimal based on, for example, proxy settings and the presence of firewalls, etc.

For example, the client device might select among UDP, TCP, TLS, or HTTPS for audio and video and UDP for content screen sharing.

The real-time media servers 212 then multiplex the various chat and/or video and audio streams based on the target client device and communicate multiplexed streams to each client device. For example, the real-time media servers 212 receive chat and/or audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O) as well as network parameters such as packet loss, latency and jitter to determine how to modify the way in which streams are provided.

The client device 220 receives the stream, performs any decryption, decoding, and demultiplexing on the received streams, and then outputs the chat and/or audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia streams in some examples. As discussed above, multimedia streams may be encrypted between the client devices 220-250 and the chat and videoconference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and videoconference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and videoconference provider 210 may allow a meeting participant to notify it of inappropriate behavior or content in a meeting. Such a notification may trigger the real-time media servers to 212 record a portion of the meeting for review by the chat and videoconference provider 210. Still other functionality may be implemented to take actions based on the decrypted multimedia streams at the chat and videoconference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and videoconference provider 210 via local real-time media servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the chat and videoconference provider 210 and across many different real-time media servers 212.

Turning to the network services servers 214, these network services servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and videoconference provider under a supervisory set of servers. When a client device 220-250 accesses the chat and videoconference provider 210, it will typically communicate with one or more network services servers 214 to access their account or to participate in a meeting.

When a client device 220-250 first contacts the chat and videoconference provider 210 in this example, it is routed to a network services server 214. The client device may then provide access credentials for a user, e.g., a username and password or single sign-on credentials, to gain authenticated access to the chat and videoconference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and videoconference provider 210, or scheduling a new meeting, by interacting with the network services servers 214.

In some examples, users may access the chat and videoconference provider 210 anonymously. When communicating anonymously, a client device 220-250 may communicate with one or more network services servers 214 but only provide information to create or join a meeting, depending on what features the chat and videoconference provider allows for anonymous users. For example, an anonymous user may access the chat and videoconference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

The chat and videoconference provider 210 may use a similar process to that which is used to schedule a meeting (as described above) to create a chat channel. A user may contact the chat and videoconference provider 210 using a client device 220 and select an option to create a chat channel. After receiving various chat channel settings (e.g. a title, a participant list, etc.), the chat and videoconference provider may create a record for the chat channel and generate a chat identifier to invite one or more users to the chat channel. In some examples, the certain information associated with the chat channel may be automatically generated by the chat and videoconference provider 210.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples, additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting and/or a chat channel, client devices will send and receive multimedia streams via the real-time media servers 212, but they may also communicate with the network services servers 214 as needed during meetings. For example, if the host leaves the meeting or chat channel, the network services server(s) 214 may appoint another user as the new meeting host and assign host administrative privileges to that user. Hosts may have administrative privileges to allow them to manage their chat channels and/or meetings, such as by enabling or disabling screen sharing, muting or removing users from the meeting, assigning or moving users to the chat channel or meeting, recording meetings, etc. Such functionality may be managed by the network services server(s) 214.

For example, if a host wishes to remove a user from a chat channel, they may identify the user and issue a command through a user interface on their client device. The command may be sent to a network services server 214, which may then disconnect the identified user from the corresponding real-time media server 212. If the host wishes to move one or more participants into a meeting or chat channel, such a command may also be handled by a network services server 214, which may provide authentication information to the one or more participants for joining the chat channel and then connect the one or more participants to the chat channel. In some examples, a chat channel may not have a host.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request. Similar steps may be taken for ending a chat channel. For example, after receiving a command to terminate a chat channel, the network services server 214 communicate with the real time media server(s) 212 to stop a messaging service for the chat channel and remove any users from the chat channel records.

Depending on the functionality provided by the chat and videoconference provider, the network services server(s) 214 may provide additional functionality, such as by providing private chat and meeting capabilities for organizations, special types of meetings (e.g., webinars), etc. Such functionality may be provided according to various examples of chat and video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive chat and/or video and audio streams from each of the cameras and microphones and connect with the chat and videoconference provider 210. For example, the video conferencing hardware may be provided by the chat and videoconference provider to one or more of its subscribers, which may provide access credentials to the video conferencing hardware to use to connect to the chat and videoconference provider 210.

The video room gateway servers 216 provide specialized authentication and communication with the dedicated video conferencing hardware that may not be available to other client devices 220-230, 250. For example, the video conferencing hardware may register with the chat and videoconference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and videoconference provider 210.

Referring now to the telephony gateway servers 218, these servers 218 enable and facilitate telephony devices' participation in meetings hosed by the chat and videoconference provider 210. Because telephony devices communicate using the PSTN and not using computer networking protocols, such as TCP/IP, the telephony gateway servers 218 act as an interface that converts between the PSTN and the networking system used by the chat and videoconference provider 210.

For example, if a user uses a telephony device to connect to a meeting, they may dial a phone number corresponding to one of the chat and videoconference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and videoconference provider 210 discussed above are merely examples of such devices and an example architecture. Some chat and videoconference providers may provide more or less functionality than described above and may not separate functionality into different types of servers as discussed above. Instead, any suitable servers and network architectures may be used according to different examples.

Figure 3:
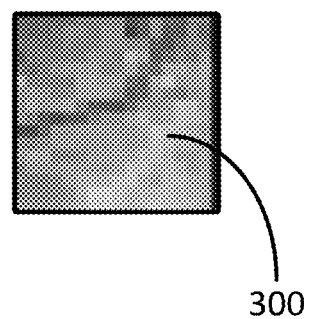
FIG. 3 shows an example of a video frame region with grid artifacts according to some aspects of the present disclosure.

During a videoconference, a camera coupled to a client device 220 can capture video frames. The video frames are compressed by a video encoder 290 installed or otherwise associated with the client device 220, shown in FIG. 2, before they are sent to the other client devices 230-250. The video compression may result in grid artifacts that are displeasing to the participants. FIG. 3 shows an example of a region 300 of a video frame with such grid artifacts. These grid artifacts can reduce the quality of the video stream. To alleviate such grid artifacts, the video encoder 290 associated with the client device 220 can implement the technologies described below.

Figure 4:
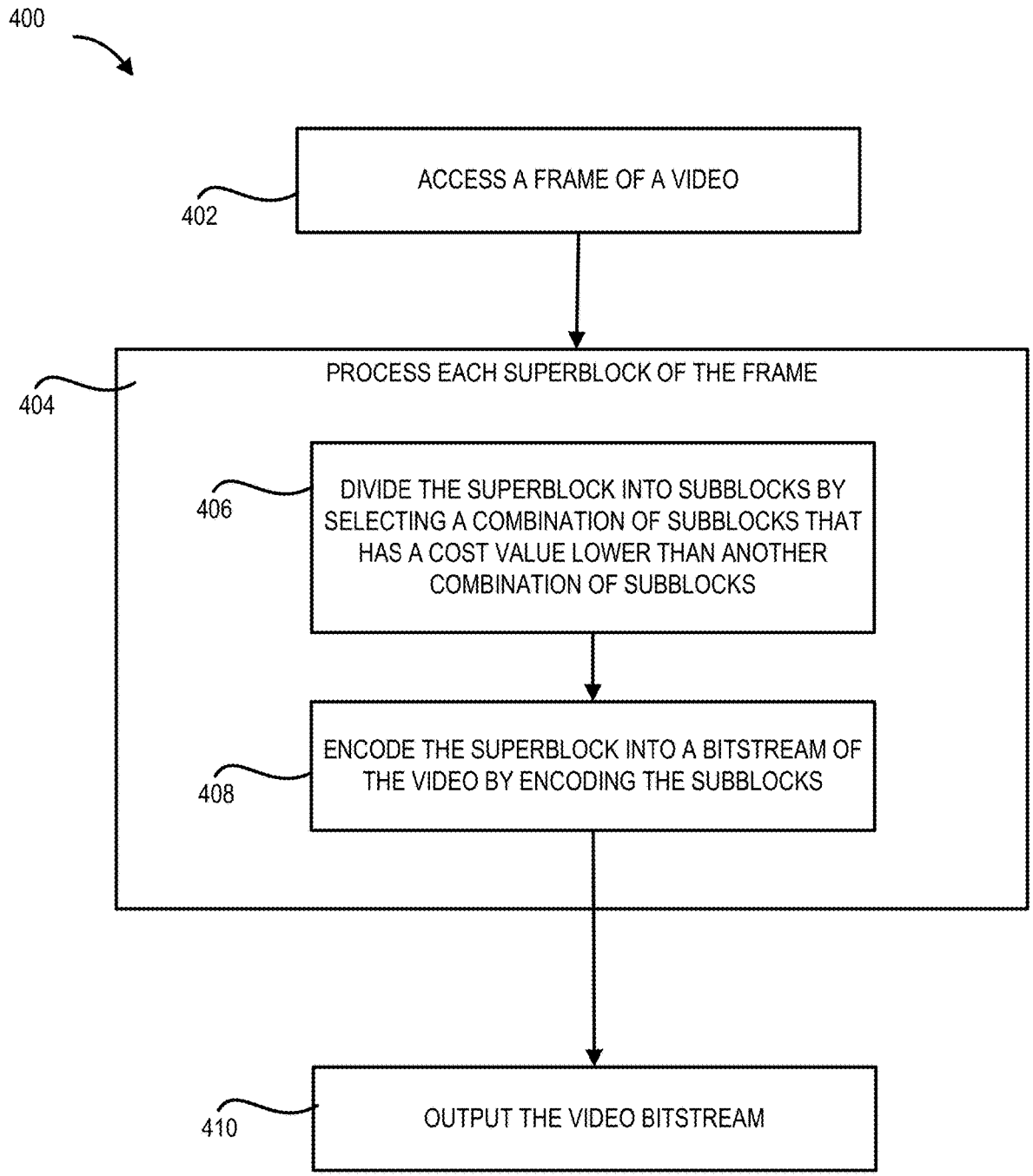
FIG. 4 shows a flowchart of an example of a process for encoding a frame of a video with grid artifacts reduction techniques according to some aspects of the present disclosure.

Referring now to FIG. 4, shown is a flowchart of an example of a process 400 for encoding a frame of a video with grid artifacts reduction techniques according to some aspects of the present disclosure. Other examples may involve more steps, fewer steps, different steps, or a different sequence of steps than is shown in FIG. 4. In some examples, some or all of the following operations may be performed by a video encoder (e.g., video encoder 290) executing on a processor.

Figure 5:
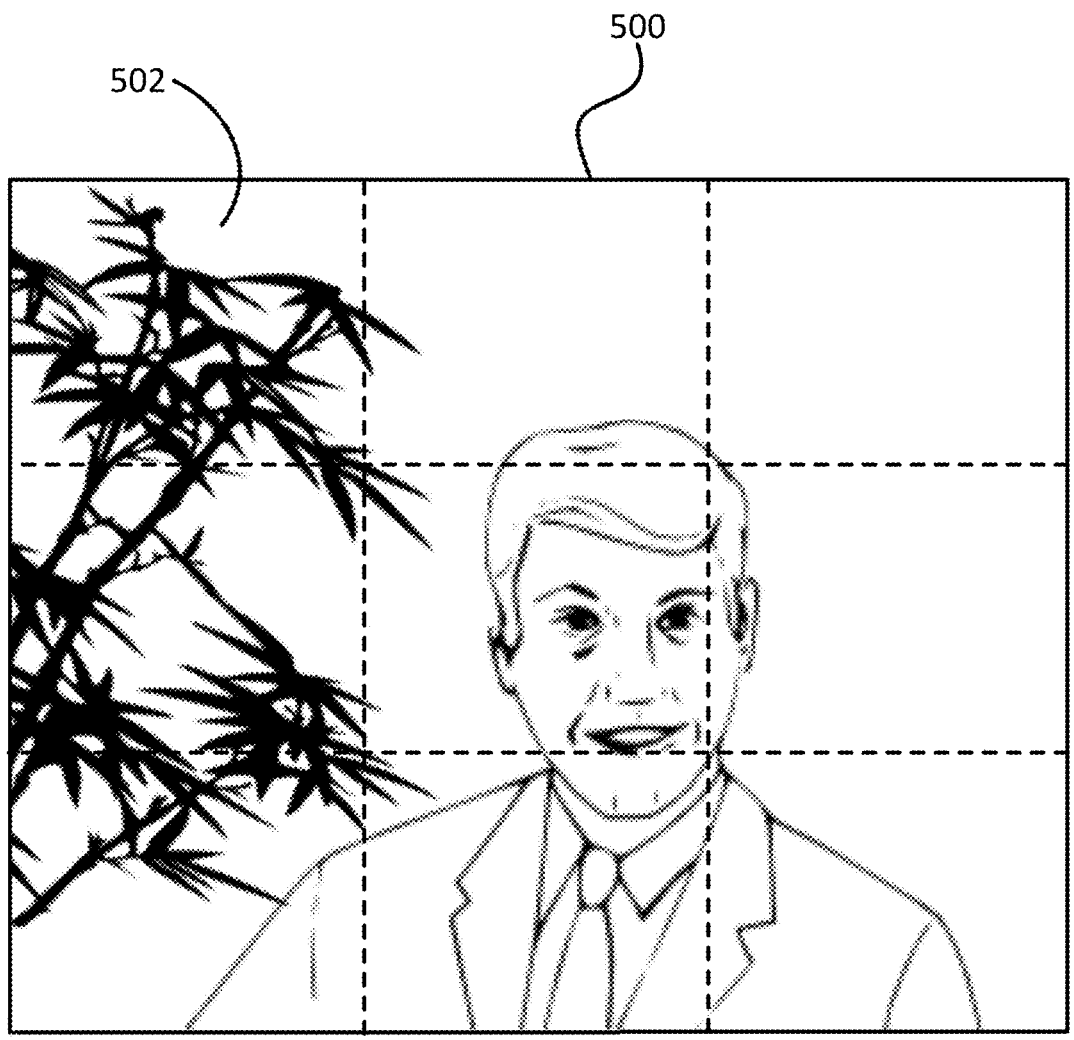
FIG. 5 shows an example of superblocks associated with a video frame according to some aspects of the present disclosure.

At block 402, the processor accesses a video frame. The video frame can be associated with a video stream, a pre-recorded video, etc. The processor can access the video frame from any suitable source, such as a camera coupled to the client device. In some examples involving a videoconference, the video frame may be captured by a webcam coupled to the client device, where the client device can be operated by a participant in the videoconference. The video frame may depict the participant as well as other objects. The frame can be divided into blocks of a particular size. In particular, the content of the video frame can be separated into adjacent blocks, referred to as superblocks. The superblocks may be square or rectangular shaped and of the same size. The size of the superblocks can depend on various factors, such as the size of the video frame. Examples of superblock sizes can include 128×128 pixels or 64×64 pixels. One example of a video frame 500 divided into superblocks 502 is shown in FIG. 5.

Figure 6:
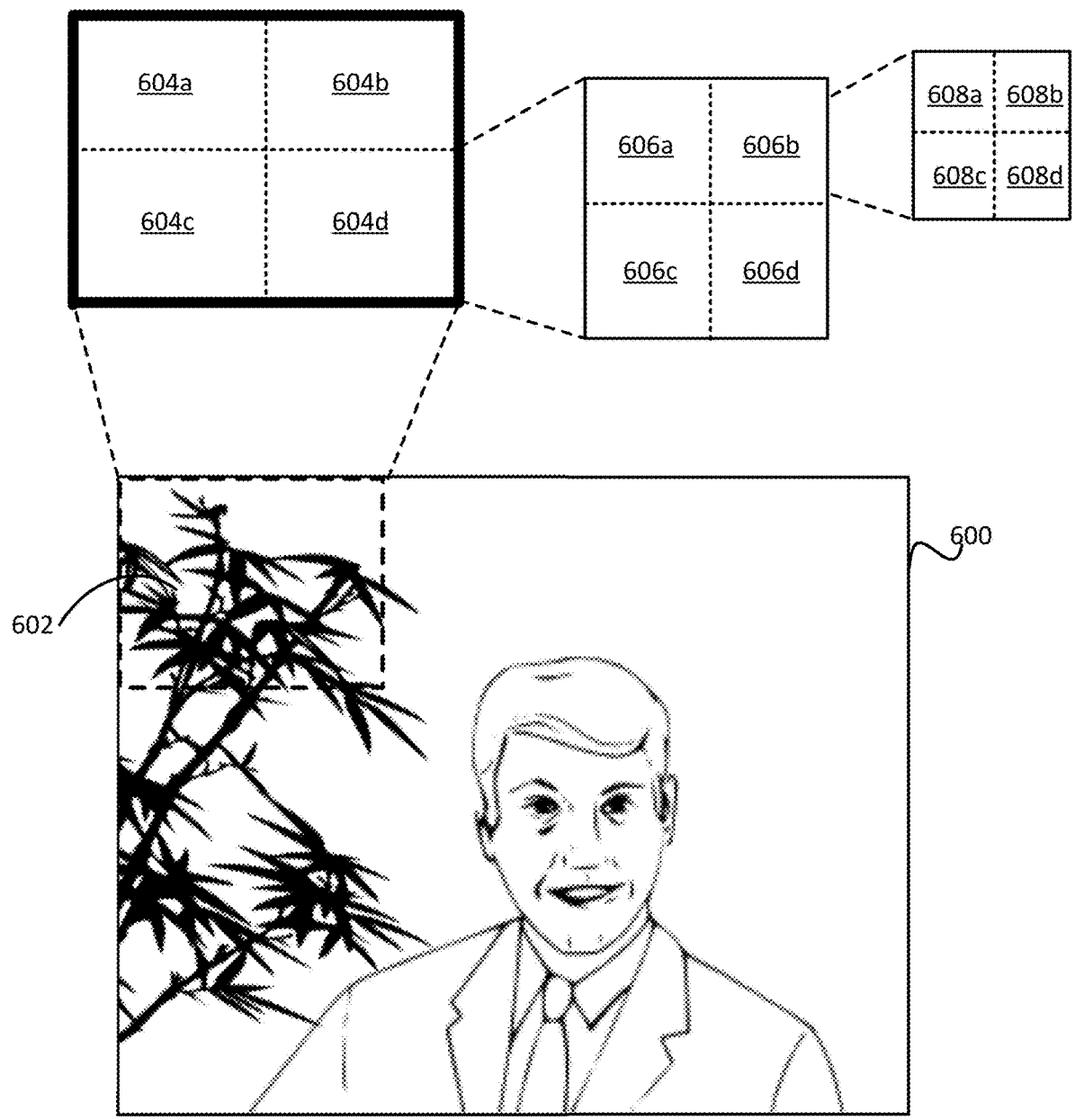
FIG. 6 shows an example of sub-blocks of a superblock of a video frame according to some aspects of the present disclosure.

At block 404, which includes 406-408, the process 400 involves processing each superblock of the frame to encode the frame into bits. At block 406, the processor divides the superblock into subblocks by selecting a combination of subblocks that has a lower cost value than another combination of subblocks for the superblock. For example, the processor can divide the superblock into multiple subblocks using a partitioning algorithm, such as a quad tree decision algorithm. For instance, the processor can first divide a 64×64 superblock into four 32×32 regions. One example of this is shown in FIG. 6, whereby a single superblock 602 is divided into four regions 604*a-d*. The processor may determine to further divide one or more of the 32×32 regions into smaller regions or sub-regions, such as 16×16 regions. The regions and sub-regions may also be referred to as subblocks. Thus, different regions or subblocks of a single superblock may have different sizes. One example of this is shown in FIG. 6, whereby a region 604*d* is first divided into four sub-blocks 606*a-d*, and then sub-block 606*b* is further divided into four smaller sub-blocks 608*a-d*.

Figure 7:
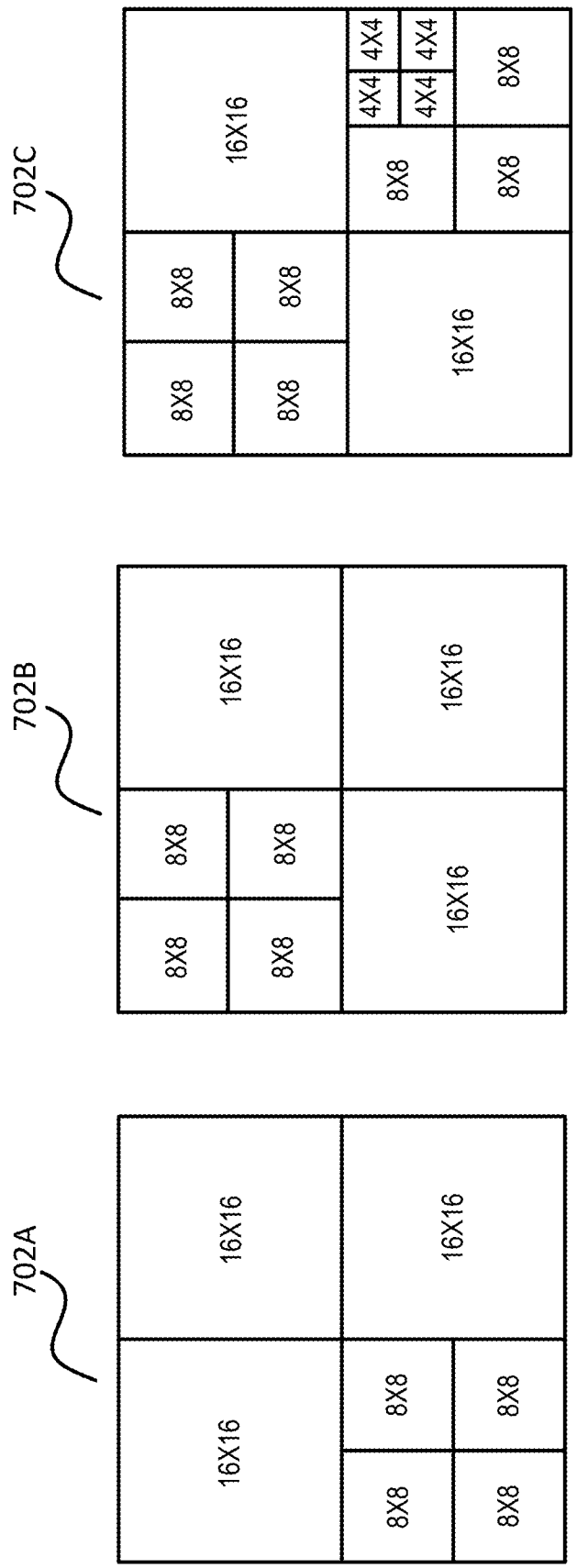
FIG. 7 shows examples of different combinations of subblocks generated by different partitioning schemes according to some aspects of the present disclosure.

There can be different ways (referred to as "partitioning schemes") to divide the regions and sub-regions for a superblock thereby leading to different combination of subblocks. FIG. 7 shows examples of different combinations of subblocks generated by different partitioning schemes. For example, the combination of subblocks 702A is generated by a partitioning scheme to divide the superblock into four 16×16 regions and further divide the lower left region into four 8×8 sub-regions. As a result, the combination 702A includes three 16×16 subblocks and four 8×8 subblocks arranged as shown in FIG. 7. Likewise, the combination of subblocks 702B also include three 16×16 subblocks and four 8×8 subblocks but generated using a different partitioning scheme. This partitioning scheme divides the superblock into four 16×16 regions and further divide the upper left region into four 8×8 sub-regions as shown in FIG. 7. The combination of subblocks 702C is generated by another partitioning scheme that divides the superblock into four 16×16 regions and further divide the upper left region into four 8×8 sub-regions. This partitioning scheme further divides the lower right 16×16 region into four 8×8 sub-regions out of which the upper right sub-region is. further divides into four 4×4 sub-regions. As a result, the combination 702C includes two 16×16 subblocks, seven 8×8 subblocks, and four 4×4 subblocks.

Figure 8:
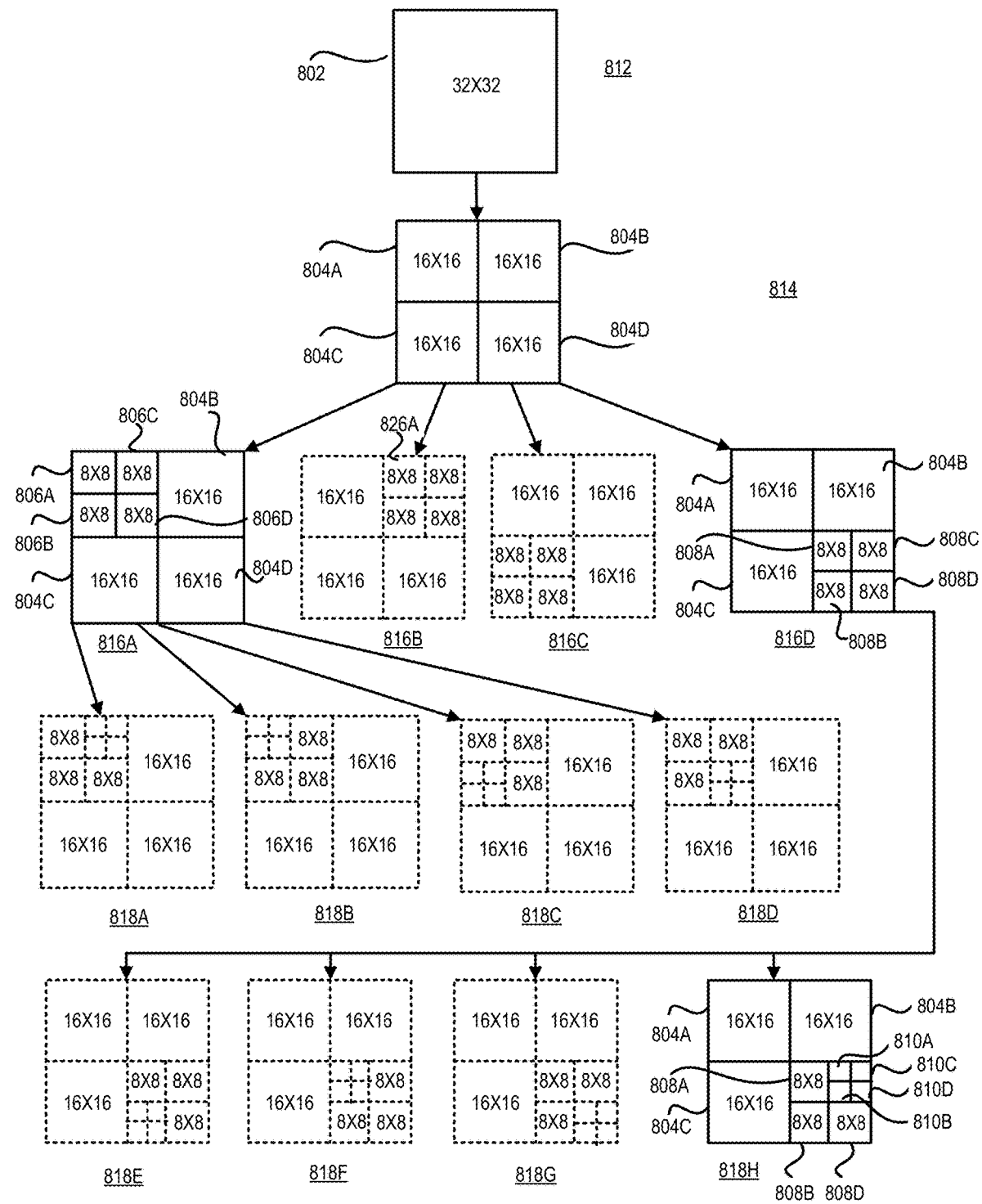
FIG. 8 shows an example of generating candidate partitioning schemes and candidate combinations of subblocks for a superblock, according to some aspects of the present disclosure.

As can be seen from the examples shown in FIG. 7, there is at least one region in the superblock that is divided differently (e.g., having different sizes or numbers of subblocks) in different partitioning schemes. In some examples, dividing a region into a number of smaller regions in a partitioning scheme is performed based on certain conditions being satisfied, such as the number of non-zero residuals in the regions is larger than a threshold value. FIG. 8 shows an example process for determining the different partitioning schemes, which is described in detail later on.

To partition the superblock into subblocks for encoding, a partitioning scheme (and thus the associated combination of subblocks) is selected from the multiple partitioning schemes. To do so, a cost value can be determined for each combination of subblocks. An example of the cost can be the rate-distortion (RD) cost defined for a portion of a frame, though other types of costs are also possible. A portion of a frame can be a superblock, a subblock, a region, or a sub-region. Rate can refer to the amount of data required to encode the portion of video frame, and distortion can refer to the loss of video quality for the portion. The RD cost may be determined according to the following equation:

$$RD\ Cost = D + \lambda * R$$

where D is the coding distortion, R is the current coding rate, and λ is a Lagrange multiplier. D may be determined by comparing the original portion to the predicted portion or reconstructed portion (e.g., the original pixels of the original portion to the predicted pixels of the predicted portion) to determine their differences. R can be the estimated or actual number of bits used for encoding the portion of the video frame. A higher RD cost may be less desirable than a lower RD cost. For a partitioning scheme, the cost value can be determined as the sum of the RD costs of individual subblocks in the combination of subblocks. In other words, an RD cost value can be calculated for each subblock in the combination of subblock's and the sum of these RD cost values can be used as the cost value associated with the combination of subblocks (and thus the corresponding partitioning scheme). The partitioning scheme having the lowest cost value can be selected to partition the superblock into subblocks for encoding.

At block 408, the processor encodes, by encoding the subblocks as determined at block 406, the superblock to generate encoded bits to be included in the bitstream of the video. For example, the processor can generate a predicted block for each sub-block. The predicted block can be a predicted version of the sub-block, where the predicted block has the same size and number of pixels as the sub-block. For example, if the sub-block is 32×32 pixels, the predicted block will also be 32×32 pixels. The predicted block can be generated using any suitable technique, such as intra-prediction or inter-prediction. Intra-prediction exploits spatial redundancy (e.g., correlation among pixels) in a video frame by calculating prediction values through interpolation or extrapolation from already coded pixels in the same video frame. With intra-frame prediction, only information from the current video frame is used to generate the predicted block, and thus the prediction is not relative to any other video frame in the video sequence. Inter-prediction exploits temporal and spatial redundancy (e.g., correlation among pixels) in multiple frames by calculating prediction values for a block through interpolation or extrapolation from already coded pixels in the another video frame.

After generating the predicted block, the processor can next subtract the predicted block from the sub-block, to produce a residual block expressing the difference between the predicted block and the sub-block. The residual block can be the same size as the sub-block and the predicted block—e.g., 16×16 pixels. The values in the residual block can be referred to as spatial residuals, because they are in the spatial domain. Each spatial residual can represent the difference between (i) a predicted pixel in the predicted block and (ii) an original pixel in the sub-block.

After generating the residual block, the processor can perform a transformation operation on the spatial residuals. The transformation operation can involve applying a transform function (e.g., a discrete cosine transform) to the spatial residuals, to transform them into frequency-domain coefficients. For example, if the residual block has 16×16 pixels, then there will be 256 input values to the transform operation that will yield 256 frequency-domain coefficients. The frequency-domain coefficients can be referred to as frequency residuals, because they are a representation of the spatial residuals in the frequency domain.

After the transform operation, a quantization operation can be performed to quantize the frequency residuals. The quantization operation may set certain frequency residuals to zero, such as the frequency residuals that are smaller than the quantization step or half of the quantization step. Thus, following quantization, there may be some number of zero-valued frequency residuals and some number of non-zero frequency residuals. The quantized residuals can be further encoded, such as through entropy coding, to generate binary bits representing these residuals. The binary bits can be included into the bitstream of the video. Blocks 406 and 408 may be repeated for each superblock in the frame. At block 410, the encoded video bitstream, which include the encoded version of the current frame and other frames, can be output, for example, for transmitting over a network or for storage.

As mentioned earlier, in some examples a processor can implement a partitioning algorithm (e.g., a quad tree decision algorithm) to divide a superblock into subblocks to generate different partitioning schemes. A subblock is smaller or equal to in size than the size of the superblock. For example, if the superblock is 64×64, a subblock may be 64×64, 32×32, 16×16, 8×8, or 4×4. The partitioning algorithm can be configured to iteratively divide regions of the superblock into smaller and smaller sub-regions according to one or more partitioning patterns.

One example of a partitioning pattern is the four-way split pattern, in which a region (e.g., the superblock or a subblock) is split into four equally-sized subblocks. Using the four-way split pattern, the partitioning algorithm can recursively subdivide the superblock into sub-blocks as small as 4×4 pixels. One example of this is shown in FIG. 6. In that example, a superblock 602 of a video frame 600 is initially divided into four regions 604a-d. Some or all of regions 604a-d may then be divided in the next level of recursion. For example, region 604d is divided into sub-blocks 606a-d during the next level of the recursion. Some or all of sub-blocks 606a-d may then be divided during the next level of recursion. For example, sub-block 606b is divided into sub-blocks 608a-d in the next level of recursion. This recursive process can be performed on some or all of the regions 604a-d (e.g., in parallel to one another), to divide some or all of those regions 604a-d into incrementally smaller and smaller sub-blocks, until the smallest sub-block size (e.g., 4×4 pixels) is reached.

During each level of recursion for a given region, the processor can divide the region (e.g., 16×16) into sub-regions (e.g., four 8×8 sub-regions) and determine whether the number of non-zero frequency residuals in each sub-region exceeds a predefined threshold defined for the size of such sub-region. If the number of non-zero frequency residuals in each sub-region does not exceed the predefined threshold, the sub-regions (e.g., four 8×8 sub-regions) can be marked as candidate subblocks. If the number of non-zero frequency residuals in at least one sub-region exceeds the predefined threshold, then the sub-region, if coded as a subblock, is likely to produce grid artifacts and can be discarded (i.e., not used as a subblock). As a result, the partitioning of the region into sub-regions can be discarded and the region itself is used as a subblock. The next level of recursion can then be performed by treating each candidate subblock as a region and further divide it into smaller sub-regions as described above. In further examples, each discarded sub-region is also partitioned into smaller sub-regions. Each of the smaller sub-regions is examined to determine whether the number of non-zero frequency residuals in each of the smaller sub-regions is below or equal to the predefined threshold for the size of the smaller sub-regions. If so, the smaller sub-regions can be marked as candidate subblocks. If one of the smaller sub-regions has the number of non-zero frequency residuals higher than the threshold, the partition is discarded and each of the smaller sub-regions is further divided as described above.

The above process can repeat until the smallest subblock size is reached. At the end of this process, there may be multiple candidate coding sizes for a single region. These candidate coding sizes can be combined with candidate coding sizes of other regions to generate different combination of subblocks for use in selecting the partitioning scheme for the superblock as described above with respect to FIG. 7.

FIG. 8 illustrates an example of generating the candidate partitioning schemes and the different combinations of subblocks for superblock, according to some aspects of the present disclosure. In FIG. 8, a superblock 802 has a size of 32×32. The superblock 802 can be divided into four sub-regions 804A-804D each having a size 16×16. This partitioning scheme is labeled as partitioning scheme 814 in FIG. 8. To determine whether this partitioning scheme 814 can be utilized, the video encoder can determine whether the number of non-zero frequency residuals in each sub-region 804A-804D exceeds a predefined threshold defined for a region having the size 16×16. The number of non-zero frequency residuals for a sub-region can be determined by generating the predicted block for the sub-region, calculating the difference between the original values and the predicted values for the sub-region, transforming and quantizing the differences, and identifying the number of quantized values that are non-zero as described in detail above.

In the example shown in FIG. 8, the number of non-zero frequency residuals in each sub-region 804A-804D does not exceed the predefined threshold. As such, the partitioning scheme 814 can be used as a candidate to partition the superblock and the corresponding subblocks 804A-804D is a candidate combination of subblocks. Further, each of the subblock 804A-804D can be further divided into smaller regions to identify additional candidate partitions. As shown in FIG. 8, four different partitioning schemes 816A-816D can be used to divide the subblock 804A-804D, respectively, to generate four different combinations of subblocks. For example, partitioning scheme 816A divides the subblock 804A into four 8×8 sub-regions 806A-806D. For each of the 8×8 subregions 806A-806D, the video encoder determines whether the number of non-zero frequency residuals in each sub-region 806A-806D exceeds a predefined threshold for the block size 8×8. If the number of non-zero frequency residuals in each sub-region 806A-806D does not exceed the predefined threshold for the block size 8×8, the partitioning scheme 816A can be used as a candidate for partitioning the superblock 802 and the corresponding combination of subblocks 806A-806D and 804B-804D is a candidate combination of subblocks.

Likewise, partitioning scheme 816B divides the subblock 804B into four 8×8 sub-regions; partitioning scheme 816C divides the subblock 804C into four 8×8 sub-regions; partitioning scheme 816D divides the subblock 804D into four 8×8 sub-regions 808A-808D. For each of the partitioning schemes, the video encoder determines whether the number of non-zero frequency residuals in each 8×8 sub-region exceeds the predefined threshold for the block size 8×8. If any of the four 8×8 sub-regions of a 16×16 subblock satisfies this condition (i.e., the number of non-zero frequency residuals exceeds the threshold), the partitioning scheme is discarded. For example, partitioning scheme 816B is discarded because the number of non-zero frequency residuals in the 8×8 sub-region 826A exceeds the threshold. Similarly, partitioning scheme 816C is also discarded because the number of non-zero frequency residuals in one of 8×8 sub-region exceeds the threshold. The discarded partitioning schemes are shown in dotted line and the candidate partitioning schemes are shown in solid lines in FIG. 8.

For each of the candidate partitioning schemes 816A and 816D, the process can be repeated until the sub-region reaches the smallest size, 4×4 in this example. As shown in FIG. 8, based on the combination of subblocks generated by partitioning scheme 816A, the four 8×8 subblocks 806A-806D are divided into 4×4 sub-regions according to four partitioning schemes 818A-818D, respectively. Similarly, based on the combination of subblocks generated by partitioning scheme 816D, the four 8×8 subblocks 808A-808D are divided into four 4×4 sub-regions according to four partitioning schemes 818E-818H, respectively. For each of the generated 4×4 region, the encoder determines whether the number of non-zero frequency residuals in the 4×4 sub-region exceeds the predefined threshold for the block size 4×4. If the condition is satisfied for any of the four 4×4 sub-regions in a partitional scheme, the partitioning scheme is discarded. As shown in FIG. 8, partitioning scheme 818H is marked as a candidate partitioning scheme because in each of the 4×4 sub-regions 810A-810D, the number of non-zero frequency residuals does not exceed the predefined threshold, whereas the partitioning schemes 818A-818G are discarded. As a result, in FIG. 8, there are four candidate partitioning schemes 814, 816A, 816D and 818H. Their corresponding combinations of subblocks are the candidate combinations of subblocks to be used to select the subblocks for the superblock as discussed above with respect to block 406 in FIG. 4. Note that in some examples, the superblock 802 itself can be used as a subblock for encoding if the number of non-zero frequency residuals in the superblock does not exceed the predefined threshold for the block size of the superblock (32×32 in the example of FIG. 8). In those examples, the candidate partitioning schemes also include the partitioning scheme 812 which treats the superblock as one subblock.

As described above, in some examples, each discarded region can be further divided into sub-regions and if the number of non-zero frequency residuals in each of the sub-regions does not exceed the predefined threshold for the size of the sub-region, these sub-regions can be marked as candidate subblocks. To apply this method to the example shown in FIG. 8, regions in the combinations of blocks generated by the discarded partitioning scheme 816B and 816C can be further divided. For instance, in the above example, the partitioning scheme 816B is discarded because the 8×8 region 826A does not satisfy the condition on the number of non-zero frequency residuals (but the other three 8×8 regions satisfy the condition). Here, the 8×8 region 826A can be further divided into four 4×4 blocks. If each of these four 4×4 blocks satisfy the condition, then these 4×4 blocks can be marked candidate subblocks. As a result, there can be another candidate combination of subblocks which has the same subblocks as shown for 816B except that region 826A is replaced by four 4×4 subblocks. Other discarded partitioning schemes may be further divided in a similar way to identify more candidate combinations of subblocks.

As discussed above, each block size (e.g., 32×32, 16×16, 8×8, or 4×4) has a corresponding predefined threshold for use in determining the candidate partitioning schemes. The predefined threshold may be predetermined through testing. If the number of non-zero frequency residuals is large, then there may be a greater chance of grid artifacts. There can be different predefined thresholds for different coding sizes. For instance, the predefined threshold for a coding size of 64×64 pixels may be a value that is between 300-500. And the predefined threshold for a coding size of 32×32 pixels may be a value that is between 250-400. The predefined threshold for each coding size can be stored in a predefined mapping, which can be accessed by the processor to determine the appropriate threshold for the selected coding size.

Figure 9:
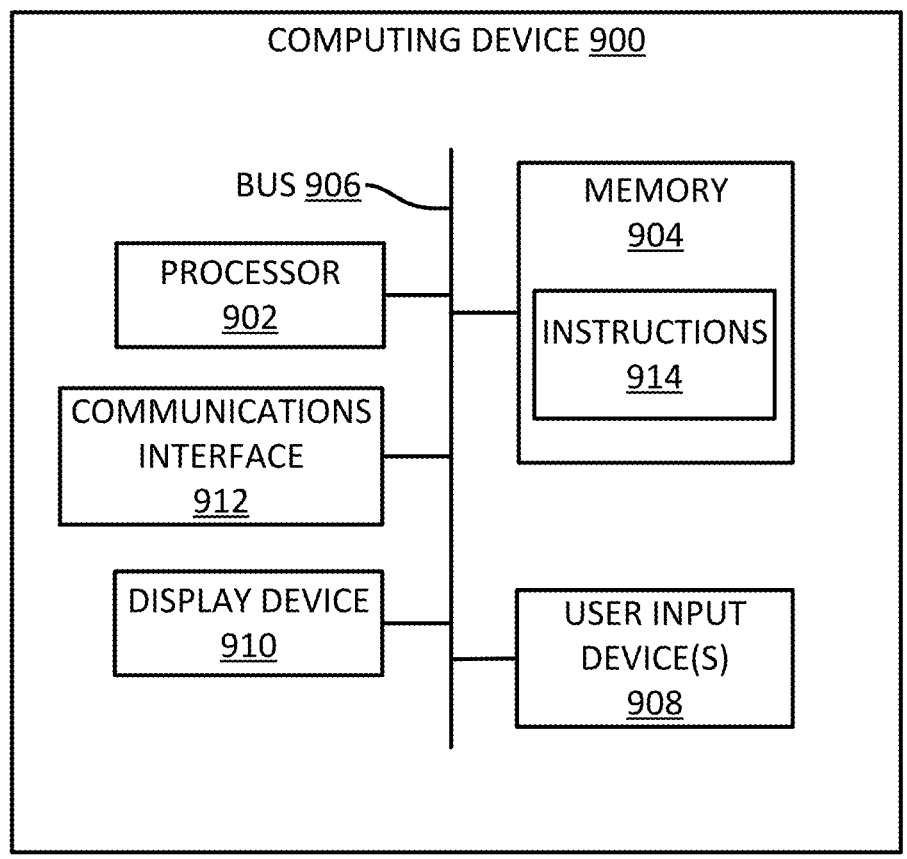
FIG. 9 shows a block diagram of an example of a computing device usable to implement some aspects of the present disclosure.

FIG. 9 shows a block diagram of an example of a computing device 900 usable to implement some aspects of the present disclosure. In some examples, the computing device 900 may correspond to any of the client devices described above, such as client devices 140-180 of FIG. 1 or 220-250 of FIG. 2.

The computing device 900 includes a processor 902 that is in communication with the memory 904 and other components of the computing device 900 using one or more communications buses 906. The processor 902 is configured to execute processor-executable instructions 914 stored in the memory 904 to perform one or more processes described herein. In some examples, the instructions 914 may correspond to the pre-encoder 292 or the video encoder 290 of FIG. 2.

As shown, the computing device 900 also includes one or more user input devices 908 (e.g., a keyboard, mouse, touchscreen, video capture device, and/or microphone) to accept user input and the display device 910 to provide visual output to a user. The computing device 900 further includes a communications interface 912. The communications interface 912 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of computer-readable medium may include, but are not limited to, an electronic, optical, magnetic, or other storage device capable of providing a processor, such as the processor in a videoconferencing server, with processor-executable instructions. Other examples of computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

Certain aspects and features can be implemented according to one or more of the following examples. As used below, any reference to a series of examples is to be understood as reference to each of those examples disjunctively (E.g., "Examples 1-4" is to be understood as Examples 1, 2, 3, or 4").

Example #1: a method comprising: accessing, by one or more processors, a frame of a video, the frame comprising a plurality of superblocks; dividing a superblock in the plurality of superblocks into a plurality of subblocks, the dividing comprising: dividing the superblock according to a first partitioning scheme to generate a first combination of subblocks for the superblock, wherein a count of non-zero residuals in each subblock in the first combination of subblocks is less than a corresponding threshold set for a size of the subblock, dividing the superblock according to a second partitioning scheme to generate a second combination of subblocks for the superblock, wherein a count of non-zero residuals in each subblock in the second combination of subblocks is less than a corresponding threshold set for a size of the subblock, wherein at least one region of the superblock comprises a different number of subblocks in the first combination of subblocks than the second combination of subblocks, and determining the plurality of subblocks for the superblock as the first combination of subblocks based on a first cost value associated with the first combination of subblocks being lower than a second cost value associated with the second combination of subblocks; and encoding, by the one or more processors, the superblock into a video bitstream representing the video by encoding the plurality of subblocks.

Example #2: The method of Example #1, wherein the first cost value comprises a first rate-distortion (RD) cost value determined by using the first combination of subblocks to encode the superblock, and the second cost value comprises a second RD cost value determined by using the second combination of subblocks to encode the superblock.

Example #3: The method of Example #1-2, wherein the first RD cost value is determined as a sum of individual RD cost values calculated for the respective subblocks.

Example #4: The method of any of Examples #1-3, wherein a RD cost value for a subblock is determined based on a distortion and a rate, wherein the distortion measures a difference between original pixels in the subblock and predicted pixels or reconstructed pixels for the subblock, and the rate is an estimated number of bits used for encoding the subblock.

Example #5: The method of any of Examples #1-4, wherein dividing the superblock according to the first partitioning scheme to generate the first combination of subblocks for the superblock comprises: dividing a region of the superblock into a plurality of sub-regions; and dividing a sub-region of the plurality of sub-regions into subblocks based on determining that a count of non-zero residuals in the sub-region is less than a threshold corresponding to a size of the sub-region.

Example #6: The method of any of Examples #1-5, wherein a size of the region of the superblock is one of 128-by-128, 64-by-64, 32-by-32, 16-by-16, or 8-by-8.

Example #7: The method of any of Examples #1-6, wherein each of the plurality of subblocks is encoded using an intra-prediction mode or an inter-prediction mode.

Example #8: The method of any of Examples #1-7, wherein the video is generated at a client device associated with a participant of a video conference during the video conference and the video bitstream representing the video is transmitted to another client device associated with another participant of the video conference during the video conference.

Example #9: a non-transitory computer-readable medium comprising program code that is executable by one or more processors to cause the one or more processors to: access a frame of a video, the frame comprising a plurality of superblocks; divide a superblock in the plurality of superblocks into a plurality of subblocks, the dividing comprising: dividing the superblock according to a first partitioning scheme to generate a first combination of subblocks for the superblock, wherein a count of non-zero residuals in each subblock in the first combination of subblocks is less than a corresponding threshold set for a size of the subblock, dividing the superblock according to a second partitioning scheme to generate a second combination of subblocks for the superblock, wherein a count of non-zero residuals in each subblock in the second combination of subblocks is less than a corresponding threshold set for a size of the subblock, wherein at least one region of the superblock comprises a different number of subblocks in the first combination of subblocks than the second combination of subblocks, and determining the plurality of subblocks for the superblock as the first combination of subblocks based on a first cost value associated with the first combination of subblocks being lower than a second cost value associated with the second combination of subblocks; and encode the superblock into a video bitstream representing the video by encoding the plurality of subblocks.

Example #10: the non-transitory computer-readable medium of Example #9, wherein the first cost value comprises a first rate-distortion (RD) cost value determined by using the first combination of subblocks to encode the superblock, and the second cost value comprises a second RD cost value determined by using the second combination of subblocks to encode the superblock.

Example #11: the non-transitory computer-readable medium of Example #10, wherein the first RD cost value is determined as a sum of individual RD cost values calculated for the respective subblocks.

Example #12: the non-transitory computer-readable medium of Example #11, wherein a RD cost value for a subblock is determined based on a distortion and a rate, wherein the distortion measures a difference between original pixels in the subblock and predicted pixels or reconstructed pixels for the subblock, and the rate is an estimated number of bits used for encoding the subblock.

Example #13: the non-transitory computer-readable medium of Example #9, wherein dividing the superblock according to the first partitioning scheme to generate the first combination of subblocks for the superblock comprises: dividing a region of the superblock into a plurality of sub-regions; and dividing a sub-region of the plurality of sub-regions into subblocks based on determining that a count of non-zero residuals in the sub-region is less than a threshold corresponding to a size of the sub-region.

Example #14: the non-transitory computer-readable medium of Example #9, wherein each of the plurality of subblocks is encoded using an intra-prediction mode or an inter-prediction mode.

Example #15: the non-transitory computer-readable medium of Example #9, wherein the video is generated at a client device associated with a participant of a video conference during the video conference and the video bitstream representing the video is transmitted to another client device associated with another participant of the video conference during the video conference.

Example #16: a system comprising: one or more processors; and one or more memories including instructions that are executable by the one or more processors to cause the one or more processors to: access a frame of a video, the frame comprising a plurality of superblocks; divide a superblock in the plurality of superblocks into a plurality of subblocks, the dividing comprising: dividing the superblock according to a first partitioning scheme to generate a first combination of subblocks for the superblock, wherein a count of non-zero residuals in each subblock in the first combination of subblocks is less than a corresponding threshold set for a size of the subblock, dividing the superblock according to a second partitioning scheme to generate a second combination of subblocks for the superblock, wherein a count of non-zero residuals in each subblock in the second combination of subblocks is less than a corresponding threshold set for a size of the subblock, wherein at least one region of the superblock comprises a different number of subblocks in the first combination of subblocks than the second combination of subblocks, and determining the plurality of subblocks for the superblock as the first combination of subblocks based on a first cost value associated with the first combination of subblocks being lower than a second cost value associated with the second combination of subblocks; and encode the superblock into a bitstream representing the video by encoding the plurality of subblocks.

Example #17: the system of Example #16, wherein the first cost value comprises a first rate-distortion (RD) cost value determined by using the first combination of subblocks to encode the superblock, and the second cost value comprises a second RD cost value determined by using the second combination of subblocks to encode the superblock.

Example #18: the system of Example #17, wherein the first RD cost value is determined as a sum of individual RD cost values calculated for the respective subblocks.

Example #19: the system of Example #16, wherein dividing the superblock according to the first partitioning scheme to generate the first combination of subblocks for the superblock comprises: dividing a region of the superblock into a plurality of sub-regions; and dividing a sub-region of the plurality of sub-regions into subblocks based on determining that a count of non-zero residuals in the sub-region is less than a threshold corresponding to a size of the sub-region.

Example #20: the system of Example #16, wherein the video is generated at a client device associated with a participant of a video conference during the video conference and the video bitstream representing the video is transmitted to another client device associated with another participant of the video conference during the video conference.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations thereof in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A method comprising:
 accessing, by one or more processors, a frame of a video, the frame comprising a plurality of superblocks;
 dividing a superblock in the plurality of superblocks into a plurality of subblocks, the dividing comprising:
  dividing the superblock according to a first partitioning scheme to generate a first combination of subblocks for the superblock, wherein a count of non-zero residuals in each subblock in the first combination of subblocks is less than or equal to a corresponding threshold set for a size of the subblock,
  dividing the superblock according to a second partitioning scheme to generate a second combination of subblocks for the superblock, wherein a count of non-zero residuals in each subblock in the second combination of subblocks is less than or equal to the corresponding threshold set for the size of the subblock, wherein at least one region of the superblock comprises a different number of subblocks in the first combination of subblocks than the second combination of subblocks, and
  determining the plurality of subblocks for the superblock as the first combination of subblocks based on a first cost value associated with the first combination of subblocks being lower than a second cost value associated with the second combination of subblocks; and
 encoding, by the one or more processors, the superblock into a video bitstream representing the video by encoding the plurality of subblocks.

2. The method of claim 1, wherein the first cost value comprises a first rate-distortion (RD) cost value determined by using the first combination of subblocks to encode the superblock, and the second cost value comprises a second RD cost value determined by using the second combination of subblocks to encode the superblock.

3. The method of claim 2, wherein the first RD cost value is determined as a sum of individual RD cost values calculated for the respective subblocks.

4. The method of claim 3, wherein a RD cost value for a subblock is determined based on a distortion and a rate, wherein the distortion measures a difference between original pixels in the subblock and predicted pixels or reconstructed pixels for the subblock, and the rate is an estimated number of bits used for encoding the subblock.

5. The method of claim 1, wherein dividing the superblock according to the first partitioning scheme to generate the first combination of subblocks for the superblock comprises:
 dividing a region of the superblock into a plurality of sub-regions; and
 dividing a sub-region of the plurality of sub-regions into subblocks based on determining that a count of non-zero residuals in the sub-region is less than or equal to a threshold corresponding to a size of the sub-region.

6. The method of claim 5, wherein a size of the region of the superblock is one of 128-by-128, 64-by-64, 32-by-32, 16-by-16, or 8-by-8.

7. The method of claim 1, wherein each of the plurality of subblocks is encoded using an intra-prediction mode or an inter-prediction mode.

8. The method of claim 1, wherein the video is generated at a client device associated with a participant of a video conference during the video conference and the video bitstream representing the video is transmitted to another client device associated with another participant of the video conference during the video conference.

9. A non-transitory computer-readable medium comprising program code that is executable by one or more processors to cause the one or more processors to:
 access a frame of a video, the frame comprising a plurality of superblocks;
 divide a superblock in the plurality of superblocks into a plurality of subblocks, the dividing comprising:
  dividing the superblock according to a first partitioning scheme to generate a first combination of subblocks for the superblock, wherein a count of non-zero residuals in each subblock in the first combination of subblocks is less than or equal to a corresponding threshold set for a size of of the subblock,
  dividing the superblock according to a second partitioning scheme to generate a second combination of subblocks for the superblock, wherein a count of non-zero residuals in each subblock in the second combination of subblocks is less than or equal to the corresponding threshold set for the size of of the subblock, wherein at least one region of the superblock comprises a different number of subblocks in the first combination of subblocks than the second combination of subblocks, and determining the plurality of subblocks for the superblock as the first combination of subblocks based on a first cost value associated with the first combination of subblocks being lower than a second cost value associated with the second combination of subblocks; and encode the superblock into a video bitstream representing the video by encoding the plurality of subblocks.

10. The non-transitory computer-readable medium of claim 9, wherein the first cost value comprises a first rate-distortion (RD) cost value determined by using the first combination of subblocks to encode the superblock, and the second cost value comprises a second RD cost value determined by using the second combination of subblocks to encode the superblock.

11. The non-transitory computer-readable medium of claim 10, wherein the first RD cost value is determined as a sum of individual RD cost values calculated for the respective subblocks.

12. The non-transitory computer-readable medium of claim 11, wherein a RD cost value for a subblock is determined based on a distortion and a rate, wherein the distortion measures a difference between original pixels in the subblock and predicted pixels or reconstructed pixels for the subblock, and the rate is an estimated number of bits used for encoding the subblock.

13. The non-transitory computer-readable medium of claim 9, wherein dividing the superblock according to the first partitioning scheme to generate the first combination of subblocks for the superblock comprises:

dividing a region of the superblock into a plurality of sub-regions; and dividing a sub-region of the plurality of sub-regions into subblocks based on determining that a count of non-zero residuals in the sub-region is less than or equal to a threshold corresponding to a size of the sub-region.

14. The non-transitory computer-readable medium of claim 9, wherein each of the plurality of subblocks is encoded using an intra-prediction mode or an inter-prediction mode.

15. The non-transitory computer-readable medium of claim 9, wherein the video is generated at a client device associated with a participant of a video conference during the video conference and the video bitstream representing the video is transmitted to another client device associated with another participant of the video conference during the video conference.

16. A system comprising:
one or more processors; and
one or more memories including instructions that are executable by the one or more processors to cause the one or more processors to:

access a frame of a video, the frame comprising a plurality of superblocks;

divide a superblock in the plurality of superblocks into a plurality of subblocks, the dividing comprising:

dividing the superblock according to a first partitioning scheme to generate a first combination of subblocks for the superblock, wherein a count of non-zero residuals in each subblock in the first combination of subblocks is less than or equal to a corresponding threshold set for a size of the subblock, dividing the superblock according to a second partitioning scheme to generate a second combination of subblocks for the superblock, wherein a count of non-zero residuals in each subblock in the second combination of subblocks is less than or equal to the corresponding threshold set for the size of the subblock, wherein at least one region of the superblock comprises a different number of subblocks in the first combination of subblocks than the second combination of subblocks, and determining the plurality of subblocks for the superblock as the first combination of subblocks based on a first cost value associated with the first combination of subblocks being lower than a second cost value associated with the second combination of subblocks; and encode the superblock into a video bitstream representing the video by encoding the plurality of subblocks.

17. The system of claim 16, wherein the first cost value comprises a first rate-distortion (RD) cost value determined by using the first combination of subblocks to encode the superblock, and the second cost value comprises a second RD cost value determined by using the second combination of subblocks to encode the superblock.

18. The system of claim 17, wherein the first RD cost value is determined as a sum of individual RD cost values calculated for the respective subblocks.

19. The system of claim 16, wherein dividing the superblock according to the first partitioning scheme to generate the first combination of subblocks for the superblock comprises:

dividing a region of the superblock into a plurality of sub-regions; and dividing a sub-region of the plurality of sub-regions into subblocks based on determining that a count of non-zero residuals in the sub-region is less than or equal to a threshold corresponding to a size of the sub-region.

20. The system of claim 16, wherein the video is generated at a client device associated with a participant of a video conference during the video conference and the video bitstream representing the video is transmitted to another client device associated with another participant of the video conference during the video conference.

* * * * *